2,718,513
Patented Sept. 20, 1955

2,718,513
MANUFACTURE OF PIGMENTED CHIPS

Wallace A. Beardsell, Weston, Mass., assignor to Monsanto Chemical Company, St. Louis, Mo., a corporation of Delaware No Drawing. Application July 2, 1948,
Serial No. 36,821

6 Claims. (Cl. 260—41)

The present invention relates to improvements in the art of manufacturing chip type pigment dispersions or pigmented chips and to the finished product so prepared.

Chip type pigment dispersions or pigmented chips are particularly useful for replacing pebble mill pigment grinds and roller mill pigment grinds as pigment containing materials for use in pigmenting lacquers and other coating compositions. Such chips are added directly to a lacquer or other coating compositions and the pigment contained in the chips is dispersed throughout the lacquer merely by simple stirring. One of the big advantages of pigmented chips over pigment grinds is the fact that the chips are substantially free of solvent and the problem of adjusting the solvent content of the lacquer to allow for the solvent contained in the pigment grind is therefore eliminated. Some other advantages of pigmented chips over pigment grinds and particularly pebble mill pigment grinds include: a saving in processing time during the preparation of the chips; the increased gloss of the pigmented films or coatings which have been prepared from lacquers containing such pigmented chips; and the ease and convenience of using the chips.

However, certain chip type pigment dispersions as prepared heretofore have not been generally satisfactory and have a very restricted use since materials employed in their manufacture are not compatible with a large variety of film-forming materials which are customarily used in lacquers and other coating compositions. Other types of prior art pigmented chips, on the other hand, are not suitable in many instances for use in pigmenting lacquers and the like because they do not contain a sufficiently high percentage of pigment and relatively large quantities of materials other than pigment are necessarily introduced into the lacquer when such chips are used. Such chips generally cannot be improved because the materials employed in their manufacture cannot be mixed satisfactorily when a high percentage of pigment is present. The pigmented lacquers which are obtained by the addition of such chips are not satisfactory in many respects since the films or coatings formed therefrom do not have the same strength, flexibility, etc. as the films or coatings which the lacquer was originally designed to produce.

On the other hand, when nitrocellulose is employed as an ingredient or material in the preparation of pigmented chips a different problem is encountered. Since nitrocellulose tends to ignite and burn when subjected to shear stress and heat, elaborate precautions must be observed to prevent ignition and burning when this material is employed in the manufacture of pigmented chips. If, in spite of such precautions, ignition or combustion of the nitrocellulose does occur, the mass which is being worked must be doused or covered with water or some other inert liquid and becomes unfit for further use.

It is one object of the present invention to provide a simple and efficient procedure for preparing chip type pigment dispersions or pigmented chips.

A further object of the present invention is the preparation of pigmented chips containing materials, in addition to pigments which are readily compatible with a large variety of film-forming materials commonly employed in lacquers and other coating compositions.

A further object of the present invention is the preparation of pigmented chips which contain a high percentage of pigment and a relatively low percentage of other ingredients.

A further object of the present invention is the preparation of pigmented chips having the foregoing advantages by using materials which do not ignite and/or burn during the manufacturing operations.

Still further objects and advantages of the present invention will appear from the following description and the appended claims.

It has now been found that chip type pigment dispersions, which are especially suitable for use in the preparation of pigmented lacquers and other pigmented coating compositions, can be prepared by first thoroughly mixing, under shearing stress; (1) a pigment, (2) a copolymer of a polymerizable vinyl compound having the structural formula: R—CH=CH$_2$ where R is a phenyl or substituted phenyl radical with a secondary alkyl half ester of an ethylene $\alpha,\beta$ dicarboxylic acid and (3) a plasticizer for the copolymer. The pigment is satisfactorily ground and dispersed throughout the copolymer and plasticizer by means of any mixing apparatus or means which produces a shearing stress within the mass which is mixed therein. As examples of such apparatus or means may be mentioned two roll mills having heated rolls, jacketed Banbury mixers, jacketed kneading mixers of the single or double arm types and the like. Other suitable mixing apparatus or means, which thoroughly mix the above ingredients and break down the pigment agglomerates by shear stress may also be employed. After the mixing is completed, for example, after about one hour of working or after 2 to 4 passes through a two-roll mill having heated rolls, the plastic mass, on cooling, changes into a brittle solid mass which is readily broken into chips of suitable size and shape. The hardened and solidified mass can be broken up into chips, for example by means of hammers or other similar devices.

The pigmented chips which are prepared in the above manner are readily incorporated in a large variety of lacquers and coating compositions since the copolymer and plasticizer are soluble in a wide variety of solvents and solvent mixtures which are normally used in such lacquers and coating compositions. Moreover, such copolymers and plasticizers are also readily compatible with a large variety of film-forming materials of the type commonly employed in lacquers and coating compositions. For example, such copolymers and plasticizers are compatible with nitrocellulose; ethyl cellulose; natural resins such as dewaxed shellac, dewaxed damar, Manila copal and the like; polyacrylates and polymethacrylates such as polymerized methyl acrylate, ethyl acrylate and the like and polymerized methyl methacrylate, ethyl methacrylate and the like; polyvinyl acetal resins such as polyvinyl butyral and the like; rosin; polymerized rosins; and aminoaldehyde resins such as urea-formaldehyde resins, melamine-formaldehyde resins and their etherified derivatives obtained by a further reaction with alcohols, and the like. This list is not exhaustive, of course, and the copolymers employed herein are also compatible with other film-forming materials. In addition, since these pigmented chips contain relatively small proportions of plasticizer and copolymer, they do not substantially change the plasticizer content or film-forming characteristics of the lacquers or coating compositions in which such chips are dispersed.

The proportions of plasticizer, copolymer and pigment employed in the preparation of such pigmented chips can be varied considerably depending to some extent upon the general type lacquer or coating composition in which they are eventually used. For example, when the quantity of plasticizer and copolymer which is added along with the pigment to the lacquer is not detrimental to the end use of the lacquer, then the quantities of such plasticizer and copolymer present in the pigmented chip can be quite high. On the other hand, when the pigmented chip is added to a lacquer which is formulated to receive a certain amount of pigment, but which can only tolerate small increments of additional plasticizer or film-forming materials, then the pigmented chip is preferably prepared so as to contain a maximum quantity of pigment and a minimum quantity of plasticizer and copolymer. In preparing such a pigmented chip, it is preferable to employ a quantity of plasticizer and copolymer and a quantity of pigment which will just form a plastic mass under the conditions of mixing, that is, the mass is preferably sufficiently plastic per se to be worked in a mixing apparatus. Pigmented chips comprising up to about 70% by weight of pigment are readily prepared by the procedure described herein.

The pigmented chips, as prepared by the practice of the present invention generally comprise from about 60 to 70% pigment by weight, although lower percentages of pigment may be present when the additional quantity of copolymer and plasticizer which is thus incorporated along with the pigment in a lacquer is not disadvantageous. The remainder of the materials in the chip are primarily the copolymer and a plasticizer for the copolymer, but may include a small proportion of surface active agent and other coating additives. Generally, satisfactory results are obtained when the copolymer and plasticizer are present in the chip in a ratio of about at least two parts by weight of copolymer to one part by weight of plasticizer, although satisfactory results are also obtained when higher ratio of copolymer to plasticizer as, for example, a ratio of three parts of copolymer to one part plasticizer are present in the finished chip. The actual limits of the weight ratio of copolymer to plasticizer present in the chip will depend to a certain extent on the one hand on the ratio of copolymer to plasticizer which will yield a plastic mass capable of solidifying at normal room temperatures and, on the other hand, on the ratio of copolymer to plasticizer which will yield a plastic mass capable of being mixed under shearing stress in a heavy mixing apparatus.

The copolymers employed herein may be prepared in a variety of ways. One suitable method by which such copolymers are prepared is by first reacting a secondary aliphatic monohydric alcohol as, for example, sec butyl alcohol, methyl isobutyl carbinol, secondary octyl alcohol and the like with an ethylene $\alpha,\beta$-dicarboxylic acid or anhydride such as maleic acid, fumaric acid, maleic anhydride and the like in an amount sufficient to form a secondary alkyl half ester of such acid. The half ester so obtained is purified as, for example, by removing the unreacted acid, anhydride and alcohol and then copolymerized or it is copolymerized, without purification, with a polymerizable vinyl compound having the structural formula: R—CH=CH$_2$, where R is a phenyl or substituted phenyl radical. Examples of such vinyl compounds are styrene, nuclear substituted styrenes such as halogen substituted styrenes, for example, chloro-styrene, dichloro-styrene and the like; and alkyl substituted styrenes such as methyl styrene, dimethyl styrene and the like. Of these vinyl compounds styrene is preferred.

In preparing the copolymer, the proportions of vinyl compounds to secondary alkyl half ester may be varied considerably. Generally it is preferable to copolymerize the vinyl compound and secondary alkyl half ester in at least a molal ratio of about 1:1. Higher molal ratios of vinyl compound to half ester as, for example, molal ratios of 2:1 are also used.

In general, the secondary alkyl alcohols which are employed in preparing the above secondary alkyl half esters are those alcohols which contain from 4 to 12 carbon atoms, while those which contain from about 6 to 10 carbon atoms are preferably employed. Such alcohols and the ethylene $\alpha,\beta$-dicarboxylic acid or anhydride are generally reacted in a molal ratio varying between about 1:1 to 1:1.6 although the molal ratios of alcohol to such acid or anhydride may be lower. The secondary alkyl half ester as prepared and used herein may also comprise a minor proportion of unesterified acid or anhydride.

As examples of secondary alkyl half esters which are employed in the preparation of the above described copolymers may be mentioned sec-butyl acid maleate, methyl propyl carbinyl acid maleate, methyl isobutyl carbinyl acid maleate, methyl amyl carbinyl acid maleate, methyl hexyl carbinyl acid maleate, methyl decyl carbinyl acid maleate and the like, the corresponding acid fumarates and the like. Of these, the secondary alkyl half esters of maleic acid are preferred.

Copolymerization can be effected, when the secondary alkyl half ester and vinyl compound are mutually soluble, by heating a mixture comprising monomers of each type at a temperature between about 100 to 300° F. for a period of several hours. Emulsion polymerization methods may also be used or copolymerization may be carried out in a solvent which is capable of dissolving both the monomers and the copolymer which is formed therefrom. In the latter case the copolymer can be precipitated, for example, by the addition of a diluent which is not a solvent for the copolymer. The precipitated copolymer can then be removed from the solvent and diluent by centrifuging, filtration or the like. A compound capable of catalyzing the copolymerization reaction may also be used in any of the foregoing methods, if desired. Examples of such catalysts are the peroxides as, for example, benzoyl peroxide and the like.

The copolymers employed herein are especially suitable for the preparation of pigmented chips since they possess good wetting and taffy-like shear properties. Thus, they not only facilitate the mixing of the mass under shearing stress, but also wet the pigment particles sufficiently to speed up the mechanical breakdown of the pigment agglomerates into individual pigment particles. Moreover, such copolymers are also worked and mixed easily and efficiently under shearing stress.

A further understanding of the present invention will be obtained from the following illustrative examples, parts and percentages being by weight unless otherwise specified.

*Example I*

A copolymer (hereinafter referred to as copolymer A) was prepared by first reacting about 1 molecular proportion of methyl isobutyl carbinol with about 1 molecular proportion of maleic anhydride at a temperature of about 65° C. until the resulting product had a substantially constant acid value on continued heating. The solution so obtained was then mixed with about 1.5 molecular proportions of styrene and 0.002 molecular proportions of benzoyl peroxide and the resulting mass was heated to about 76° C. and maintained at this temperature during the period of rapid heat evolution. The temperature of the mass was then raised to approximately 120° C. for a period of 1½ hours to complete the reaction. On cooling, a hard glassy resin was obtained and this resin was then comminuted for ease in handling.

Three hundred and seventy-two parts of copolymer A (as prepared above) and 186 parts of tricresyl phosphate were mixed for about 18 minutes in a jacketed Baker-Perkins mixer having a pair of rotating arms of the kneading type. The water jacket temperature was about 103° C. during this mixing period. About 1305 parts of titanium dioxide, having a specific gravity of about 3.9 and an average particle size of about 0.3 micron, were slowly added to the plasticized copolymer in the mixer over a period of about ½ hour. At the end of the addition period the water jacket temperature was about 79° C. Near the end of the addition about 50 parts of a solvent mixture consisting of 50% toluene and 50% alcohol were added to the mass in the mixer. The cover of the mixer was then secured and the mixing was continued for a period of about 35 minutes. During the last five minutes of the run the cover was removed and the solvent which had previously been added was evaporated. The mixer was shut down and the plastic mass was removed therefrom. On cooling, the mass became brittle and was readily broken into chips.

One of the primary advantages of the pigmented chips as prepared herein in addition to the advantages previously described are the high gloss characteristics of the coatings or films which are prepared from coating compositions or lacquers in which such chips have been incorporated. Such films or coatings have a higher gloss rating than the films or coatings which are obtained from lacquers or coating compositions in which pebble mill pigment grinds have been incorporated. The following example illustrates this advantage and, in addition, illustrates the compatibility of the copolymer and plasticizer present in the pigmented chips of the present invention in a nitrocellulose lacquer.

*Example II*

A lacquer was first prepared containing the following ingredients in the proportions stated:

| | Percent |
|---|---|
| Nitrocellulose solution A | 13.96 |
| Nitrocellulose solution B | 26.74 |
| Ethyl acetate | 17.79 |
| Butyl acetate | 2.92 |
| Butyl alcohol | 2.71 |
| Toluol | 18.74 |
| Petroleum naphtha (having a distillation range of about 200–265° F. and a specific gravity of about 0.7313) | 8.05 |
| Special denatured alcohol No. 1 | 9.09 |

Nitrocellulose solution A was prepared by first mixing 37.5 parts of butyl acetate, 37.5 parts of toluol and 25.0 parts of special denatured alcohol No. 1 and then dissolving therein ½ sec. nitrocellulose in an amount sufficient to provide a solution containing 64 oz. of said nitrocellulose per gallon of solution.

Nitrocellulose solution B was prepared by mixing 35.6 parts of ethyl acetate, 53.4 parts of toluol and 11.0 parts of special denatured alcohol No. 1 and then dissolving therein 15–18 sec. nitrocellulose in an amount sufficient to provide a solution containing 28 oz. of said nitrocellulose per gallon of solution.

Ten parts of pigmented chips (prepared as described in Example I) were added to 90 parts of the above lacquer, and the ingredients were thoroughly mixed and stirred. The compatible lacquer so obtained was then applied to a glass plate by means of a Bird applicator which is capable of applying a film thickness of 0.0015 inch, thereby forming a smooth film. The glossmeter reading of this film when dry was 52 as measured by a Hunter portable photoelectric glossmeter.

A lacquer was also prepared by thoroughly mixing 23.4 parts of a white pigment grind to 76.6 parts of the lacquer as initially prepared in this example. The white pigment grind was prepared by grinding 30 parts of titanium dioxide, having a specific gravity of about 3.9 and an average particle size of about 0.3 micron, in a pebble mill for a period of about 48 hours in the presence of 13.8 parts of ethyl acetate, 13.6 parts of butyl acetate, 33.9 parts of toluol, 6.4 parts of special denatured alcohol No. 1, and 2.3 parts of 250–400 sec. nitrocellulose. The resulting lacquer was then cast into a film on a glass plate described above. The glossmeter reading of this film was 13 as measured by a Hunter portable glossmeter.

The Hunter portable photoelectric glossmeter, which was employed to measure the gloss of the above films and the gloss of films as prepared in the following example is described on page 105 of "Physical and Chemical Examination of Paints, Varnishes, Lacquers and Colors," 10th ed. (1946), by Gardner and Sward, distributed by Henry A. Gardner Laboratory Inc., Bethesda, Maryland. The method of testing the gloss of a film as described in the foregoing reference was also employed in testing the gloss of the films prepared as described herein.

The following example illustrates that a film pigmented by the use of the pigmented chips of the present invention has a higher gloss, on an equal pigment basis by weight, than a film pigmented with a pigment grind prepared by means of a three roll mill.

*Example III*

A lacquer was first prepared containing the following ingredients in the proportions stated:

| | |
|---|---|
| Ethyl acetate | 15% by volume. |
| Butyl acetate | 15% by volume. |
| Butyl alcohol | 15% by volume. |
| Toluol | 31.5% by volume. |
| Petroleum naphtha (distillation range about 200–265° F. and specific gravity about 0.7313). | 13.5% by volume. |
| Special denatured alcohol No. 1 | 10.0% by volume. |
| Nitrocellulose (6 sec.) | 8 oz. per gallon of the above solution. |

Fifteen parts of pigmented chips (prepared as described in Example I) were added to 85 parts of the above lacquer and these ingredients were thoroughly mixed until the pigment was well dispersed in the lacquer. The lacquer was then applied to a glass plate by means of a Bird applicator which is capable of applying a film thickness of 0.0015 inch, thereby forming a smooth film. The gloss reading of this film was 37 as measured by a Hunter portable glossmeter.

To 84.6 parts of lacquer, as initially prepared in this example, were added 15.5 parts of a roll mill pigment grind. This pigment grind was prepared by first mixing 19.2 parts of processed castor oil and 12.8 parts of dibutyl phthalate and then incorporating in this mix 68 parts of titanium dioxide having a specific gravity of about 3.9 and an average particle size of about 0.3 micron. The pigment and vehicle were thoroughly mixed under shearing stress by using a three roll mill. A film was prepared from this lacquer using the procedure described above. The glossmeter reading of this film was 28 as measured by a Hunter portable glossmeter.

In preparing the pigmented chips of the present invention, plasticizers and pigments other than those employed in Example I may be used. As examples of plasticizers which are employed instead of tricresyl phosphate may be mentioned diglycol ricinoleate, glyceryl mono-oleate, di-(methoxy ethyl) phthalate, nona-ethylene glycol mono-oleate, di-(2-ethoxy ethyl) phthalate, the di-ester of phthalic anhydride and diethylene glycol ethyl ether, glyceryl monoricinoleate, methyl phthalyl ethyl glycollate, ethyl phthalyl ethyl glycollate, triglycol dioctoate, 2-methoxy ethyl ricinoleate and the like, or mixtures thereof.

As examples of pigments which are employed instead of titanium dioxide may be mentioned carbon blacks such as lampblack and the like; organic pigments such as Para Red, Blazing Red, Toluidene Red, 2,4-Dinitroaniline Orange, and the like; and mineral pigments such as barium sulfate, magnesium-silicate, antimony oxide, silicon dioxide, ferric oxide, neutral lead chromate and the like. The pigments used in accordance with the invention should be compatible with the copolymer mixed therewith, that is, should not substantially react with the copolymer. Other pigments which can be employed instead of those referred to above will be apparent to those skilled in the art.

In order to facilitate the mixing of the pigment, copolymer and plasticizer, a small proportion, say about 0.5 to 5% by weight based on the total mass, of a surface active agent such as lecithin, sorbitan monolaurate, sorbitan monopalmitate, sorbitan monostearate, sorbitan mono-oleate and the like may be employed. Such surface active agents wet the various ingredients and shorten the mixing period by cutting down the length of time that is normally required to disperse the pigment particles throughout the plastic mass.

As indicated in Example I, a small proportion of solvent may be added to the plastic mass comprising the pigment, copolymer and plasticizer particularly when, as there, a high percentage of pigment is present in the mass and a closed mixer is employed. However, it is not necessary to add solvents during the mixing operation and solvents are not customarily used when the plastic mass is being worked in open mixers such as a two roll mill.

As has been pointed out previously the copolymers and plasticizers as employed in the present invention are compatible with a large variety of film-forming materials commonly employed in lacquers and coating compositions. In addition, such copolymers and plasticizers are soluble in a large variety of solvents which are normally employed in lacquers and coating compositions. As examples of solvents in which such copolymers are soluble may be mentioned alcohols such as ethanol, denatured alcohol, methanol, propanol, butanol, isobutanol and the like; acetates such as ethyl acetate, propyl acetate, butyl acetate and the like; mixtures of such alcohols and acetates; mixtures of such alcohols and/or acetates with aromatic hydrocarbons such as toluol, xylol and the like, or with aliphatic hydrocarbons such as hexane, heptane, octane and the like; and ketones such as acetone, diethyl ketone, methyl isobutyl ketone and the like.

What is claimed is:

1. Pigmented chips for use in pigmented coating compositions comprising (1) a copolymer consisting of the copolymerization product of a polymerizable vinyl compound having the structural formula: $R-CH=CH_2$, where R is a member selected from the class consisting of phenyl and substituted phenyl radicals, with a secondary alkyl half ester of an ethylene $\alpha,\beta$ dicarboxylic acid, said vinyl compound and said half ester being copolymerized in a molal ratio of 1:1 to 2:1, (2) a plasticizer for said copolymer and (3) from about 60 to 70% by weight, based on the total weight of the chips, of a pigment.

2. Pigmented chips according to claim 1, but further characterized in that the copolymer consists of the copolymerization product of a polymerizable vinyl compound having the structural formula: $R-CH=CH_2$, where R is a member of the class consisting of phenyl and substituted phenyl radicals, with a secondary alkyl half ester of an ethylene $\alpha,\beta$ dicarboxylic acid, in which the alkyl group contains from 4 to 12 carbon atoms, said vinyl compound and said half ester being copolymerized in a molal ratio of 1:1 to 2:1.

3. Pigmented chips for use in pigmenting coating compositions comprising a mixture of (1) a copolymer consisting of the copolymerization product of styrene with a secondary alkyl half ester of maleic acid, in which the alkyl group contains from 6 to 10 carbon atoms, said styrene and said half ester being copolymerized in a molal ratio of 1:1 to 2:1, (2) a plasticizer for said copolymer and (3) from about 60 to 70% by weight, based on the mixture, of a pigment.

4. Pigmented chips for use in pigmenting coating compositions comprising a mixture of (1) a copolymer consisting of the copolymerization product of styrene with methyl isobutyl carbinyl acid maleate, said styrene and said maleate being copolymerized in a molal ratio of 1:1 to 2:1, (2) a plasticizer for said copolymer and (3) from about 60 to 70% by weight, based on the mixture, of a pigment.

5. Pigmented chips for use in pigmenting coating compositions comprising a mixture of (1) a copolymer consisting of the copolymerization product of styrene with methyl amyl carbinyl acid maleate, said styrene and said maleate being copolymerized in a molal ratio of 1:1 to 2:1, (2) a plasticizer for said copolymer and (3) from about 60 to 70% by weight, based on the mixture, of a pigment.

6. Pigmented chips for use in pigmenting coating compositions comprising a mixture of (1) a copolymer consisting of the copolymerization product of styrene with methyl hexyl carbinyl acid maleate, said styrene and said maleate being copolymerized in a molal ratio of 1:1 to 2:1, (2) a plasticizer for said copolymer and (3) from about 60 to 70% by weight, based on the mixture, of a pigment.

References Cited in the file of this patent

UNITED STATES PATENTS

| 2,187,817 | Hopff et al. | Jan. 23, 1940 |
| 2,537,018 | Barrett | Jan. 9, 1951 |

FOREIGN PATENTS

| 466,898 | Great Britain | June 8, 1937 |

OTHER REFERENCES

Vinylite Resins, Preparation of Carbon Black Chips and Pastes; published by Carbide and Carbon Chemicals Corp., New York, N. Y., received in Patent Office April 29, 1940; pages 1 to 4.